United States Patent [19]

Roif

[11] Patent Number: 5,736,955
[45] Date of Patent: Apr. 7, 1998

[54] AIRCRAFT LANDING/TAXIING SYSTEM USING LACK OF REFLECTED RADAR SIGNALS TO DETERMINE LANDING/TAXIING AREA

[76] Inventor: Henry I. Roif, 143 NE. 3rd. Ave., Miami, Fla. 33132

[21] Appl. No.: 630,499

[22] Filed: Apr. 10, 1996

[51] Int. Cl.[6] .................... G01S 13/06; G01S 13/91
[52] U.S. Cl. ...................... 342/33; 342/1; 342/34
[58] Field of Search ...................... 342/34, 35, 33, 342/1, 4

[56] References Cited

U.S. PATENT DOCUMENTS

| | | | |
|---|---|---|---|
| 2,527,918 | 10/1950 | Collard | 342/1 |
| 3,725,930 | 4/1973 | Caruso, Jr. | 342/351 |
| 3,787,841 | 1/1974 | Buehler | 342/33 |
| 4,287,243 | 9/1981 | Nielsen | 342/3 X |
| 4,659,602 | 4/1987 | Birch | 428/88 |
| 4,888,590 | 12/1989 | Chase | 342/1 X |
| 5,085,931 | 2/1992 | Boyer | 342/1 X |
| 5,208,601 | 5/1993 | Hart | 342/33 |
| 5,230,763 | 7/1993 | Roth | 342/1 X |
| 5,501,724 | 3/1996 | Loff | 106/10 |

*Primary Examiner*—John B. Sotomayor
*Attorney, Agent, or Firm*—Terry M. Gernstein

[57] ABSTRACT

A system for displaying a landing/taxiing area as an aircraft approaches/taxis that landing/taxiing area. The system includes means on the landing/taxiing area that absorbs radar signals. The remainder of the landing/taxiing area reflects radar signals, and the system includes processors on board the aircraft or in the control tower for translating the signals and the lack of signals into a graphic representation of the landing/taxiing area. The representation changes as the orientation and position of the aircraft changes with respect to the landing/taxiing area. The system can include an autopilot control, head-up displays and memory systems. The system permits surface control by the tower.

19 Claims, 11 Drawing Sheets

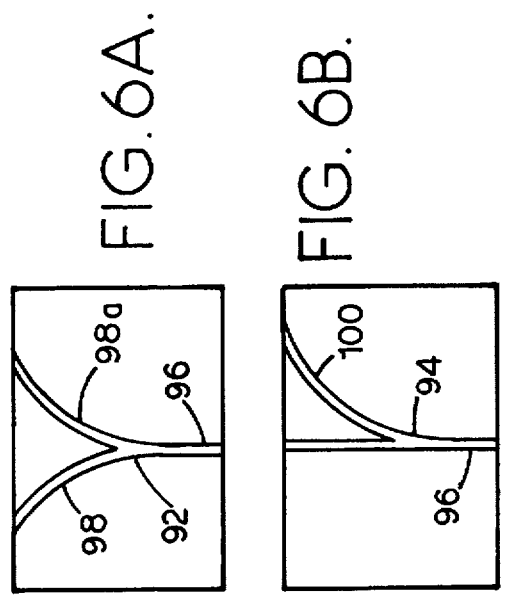
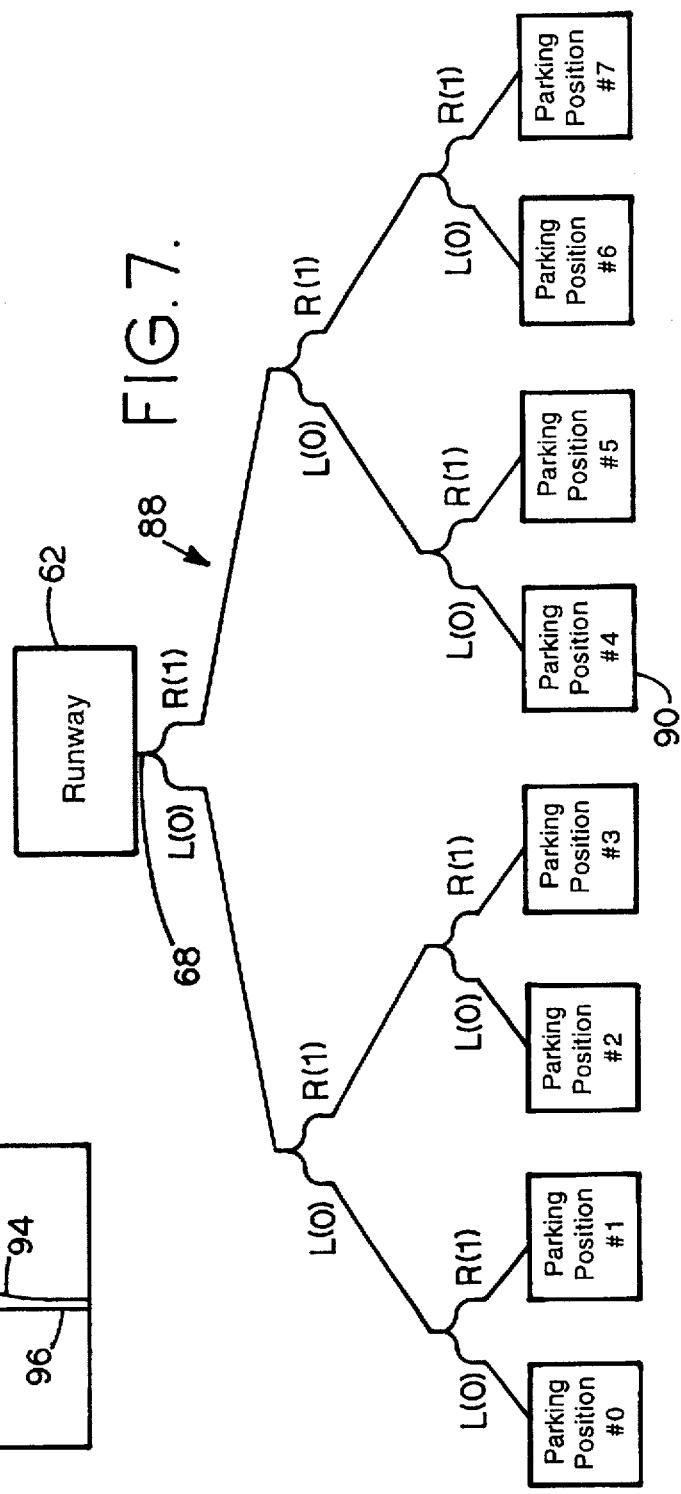

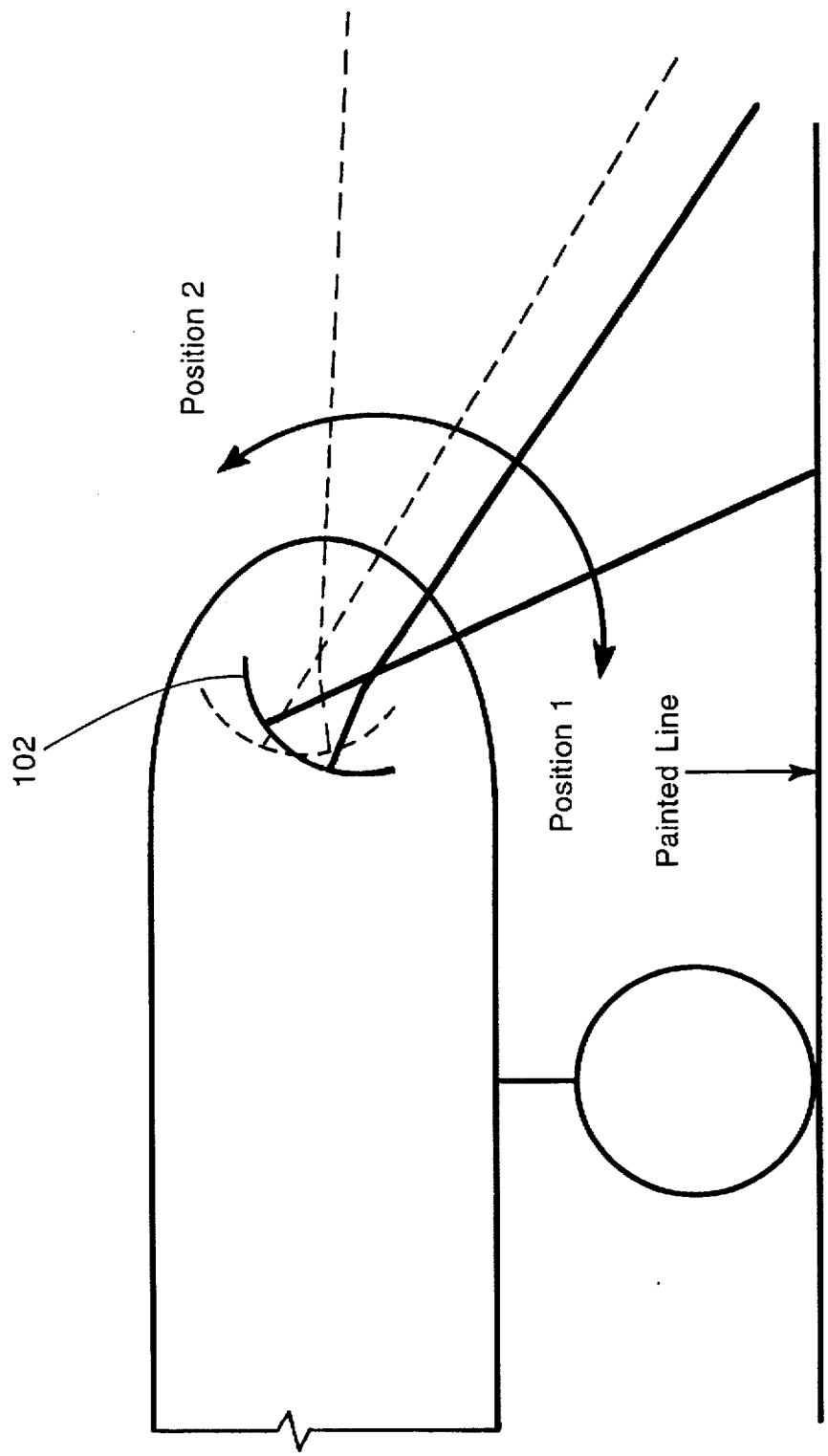

AIRCRAFT LANDING/TAXIING SYSTEM USING LACK OF REFLECTED RADAR SIGNALS TO DETERMINE LANDING/ TAXIING AREA

TECHNICAL FIELD OF THE INVENTION

The present invention relates to the general art of aircraft guidance, and to the particular field of landing/taxiing guidance systems.

BACKGROUND OF THE INVENTION

It is well known that landing and/or taxiing an aircraft are extremely complicated processes. For purposes of this disclosure, tasks are considered according to the following classifications: Ground tasks (hereinafter referred to as "taxiing"): taxiing, take-off, and parking; Air Tasks (hereinafter referred to as "landing"): landing. Landing and/or taxiing an aircraft using visual sensing is extremely complicated; however, landing/taxiing using instruments is even more complicated. Under any conditions, the landing is delicate and must be carried out with extreme accuracy, and the taxiing must also be carried out with skill and precision.

For this reason, the art includes many systems to assist a pilot in landing and which are intended to make the landing more accurate and efficient. These systems often integrate on-board equipment with ground-located equipment. Often, these systems are extremely complex and expensive. For this reason, many small airports and landing fields find it difficult to include the best equipment, or any equipment at all. If a new landing strip is being set up, especially a temporary landing strip, the cost of the landing assisting equipment may be large. This situation is exacerbated if the landing/taxiing strip is located in a remote area or in a poor or underdeveloped country.

Therefore, there is a need for an aircraft landing/taxiing guidance system that does not require the addition of a great deal of complex and expensive equipment, yet is accurate and efficient. There is a need for such a system to use as much existing equipment as possible. There is still a further need for an aircraft landing/taxiing guidance system that can be efficiently and economically used in remote areas, or on small fields or on temporary landing/taxiing strips.

Some presently available landing guidance systems are complex enough to require special workers having special training to maintain. This may create an expense that is prohibitive in some instances.

Therefore, there is a need for an aircraft landing guidance system that can be easily and inexpensively maintained by ground crews having little or no specialized experience.

In some instances, such as national defense situations, there is a need for concealing a landing/taxiing area. At the present time, if the landing/taxiing area is to be hidden, it is done by simply turning out lights. This may not be the most desirable situation in many cases, especially in some emergency or unannounced situations. Therefore, there is a need for a landing/taxiing system that can be used in a manner that conceals the landing/taxiing area from certain individuals while maintaining it "visible" to other individuals.

Landing and/or taxiing is complex enough without adding to the difficulty by having ice or some other undesirable material coat the landing/taxiing area. Still further, it is necessary for a completely safe operation for a pilot to know of the coated area before he brings the plane to that area. Presently, there is no completely accurate and reliable means or method for warning a pilot that undesirable amounts of certain materials, such as ice, are coated on the landing/taxiing area into which he is guiding his plane prior to moving into those areas. Therefore, there is a need for a landing/taxiing system that will reliably warn a pilot that the landing/taxiing area into which he is guiding his plane has undue amounts of ice or other such undesirable material on the landing/taxiing area.

Still further, landing and taxiing an airplane sometimes require a pilot to divide his attention among a great many tasks. Therefore, it is desirable to permit a pilot to focus his attention on the most critical task among many tasks. There is a need to improve presently available airplane guidance systems in this area.

OBJECTS OF THE INVENTION

It is a main object of the present invention to provide an aircraft landing/taxiing guidance system that is accurate and efficient.

It is another object of the present invention to provide an aircraft landing/taxiing guidance system that can be used with very high precision and safety in zero visibility and zero ceiling conditions.

It is another object of the present invention to provide an aircraft landing/taxiing guidance system that does not require the addition of a great deal of expensive and complex ground-located equipment to existing equipment.

It is another object of the present invention to provide an aircraft landing/taxiing guidance system that can be easily set up and efficiently used in remote areas.

It is another object of the present invention to provide an aircraft landing/taxiing guidance system that can be economically used on a temporary landing/taxiing strip.

It is another object of the present invention to provide an aircraft landing/taxiing guidance system that can be easily maintained, even by non skilled ground-based workers.

It is another object of the present invention to provide an aircraft landing/taxiing guidance system that does not require expensive retrofitting of existing aircraft located equipment.

It is another object of the present invention to provide an aircraft landing/taxiing guidance system that can be altered to conceal from electronic instruments, the landing/taxiing area when desired.

It is another object of the present invention to provide an aircraft landing/taxiing guidance system that can warn a pilot that the landing or taxiing area into which he is guiding his plane has an undesired amount of material, such as ice, on the landing/taxiing area.

It is another object of the present invention to provide an aircraft landing/taxiing guidance system that can be easily used by the pilot thereby considerably reducing training and stress.

It is another object of the present invention to provide an aircraft landing/taxiing guidance system that permits the pilot to visually view a virtual landing/taxiing area while using the system.

SUMMARY OF THE INVENTION

These, and other, objects are achieved by a self-contained aircraft located landing/taxiing guidance system that requires only minimal equipment to be located on the ground.

The system is radar based, but uses the lack of a return signal to identify and define the landing/taxiing area for the pilot. The system integrates the absence of a return signal into an algorithm or other such mathematical representation to produce a perspective simulation of the landing/taxiing area. This simulation changes in real time as the aircraft changes its orientation and position relative to the landing/ taxiing area. Specifically, paint or any other coating material that is non-reflective of radar signals is placed at the boundary edges and corners of the runway or on the center line of the landing/taxiing area or the whole landing/taxiing area. In any case, based upon the teaching of the present disclosure, one skilled in the art will be able to determine the optimal "painting" pattern. Radar signals are emitted by the aircraft, and the lack of a return signal is used by onboard computers to define a perspective view of the landing/taxiing field.

In this manner, the major components of the landing/ taxiing guidance system are located on board the aircraft, and only minimal equipment is required on the ground. Equipment existing on most aircraft is capable of emitting radar signals. Therefore, only minimal equipment needs to be added to most aircraft to adapt the aircraft to the system embodying the present invention. In fact, many airplanes are already equipped with radar equipment for weather purposes or the like. This equipment can be modified to accommodate the present system requirements. The maintenance of ground equipment is extremely low and easy, and this ground equipment can be easily and quickly set up. This is true even in remote areas, thus making temporary landing/ taxiing fields easy to set up.

The system is easily adapted to the use of Wide Angle head-up display (HUD) so a pilot can actually look at the landing/taxiing area through a HUD, a computer monitor, a hologram, virtual reality-type equipment or the like. Still further, the system can be "taught" a desired landing maneuver for a particular landing area, and then can be used to recreate that maneuver. This feature is carried out by inputting data from the system into a suitable memory, such as a hard disk or a floppy disk during a landing, if desired. This data is then replayed by the system at later times. This data can be used in zero visibility conditions in order to compare with the actual situation.

Still further, a particular airport may have a designated parking area for the airplane, and have painted radar-recognizable ground guide paths to that area from various landing areas. The paths can be computed by a simple mathematical algorithm and the pilot then may only need to enter the endpoints of the paths and the system will do the rest by selecting the paths and turns necessary to reach the designated parking area from the landing area. This frees the pilot to concentrate on other tasks such as communicating with ground control to avoid collisions when visibility is zero.

BRIEF DESCRIPTION OF THE DRAWING FIGURES

FIGS. 6A and 6B represent guidelines that can be placed on a landing/taxiing area for guiding a plane to a desired location or on a desired path.

FIG. 7 represents a parking layout which can use the system of the present invention.

FIG. 8 is a side elevational view representing an airplane following a guide path.

DETAILED DESCRIPTION OF THE PREFERRED EMBODIMENT OF THE INVENTION

Figure 1:
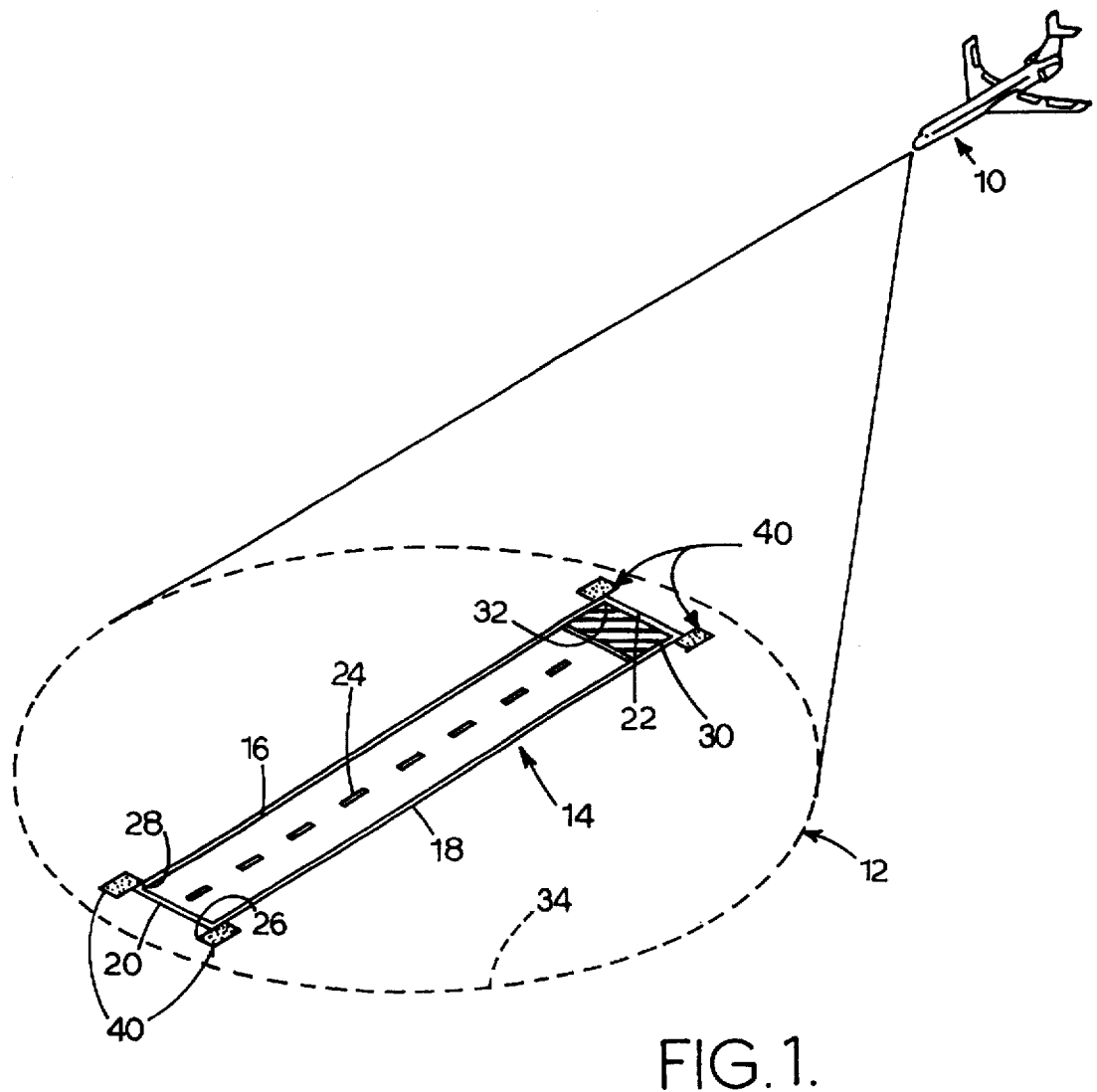
FIG. 1 is a perspective view showing an aircraft landing/ taxiing on a landing/taxiing strip that is equipped with means that are non-reflective of radar signals.

Shown in FIG. 1 is an aircraft 10 approaching a landing/ taxiing area 12 in which a landing/taxiing strip 14 is located. Landing/taxiing strip 14 includes sides 16 and 18 and ends 20 and 22, with a median strip 24 extending between ends 20 and 22 between sides 14 and 15. Sides 16 and 18 intersect ends 20 and 22 at corners 26–32 to define boundaries of the landing/taxiing strip. The on-board radar equipment of the aircraft scans an area designated by dotted circle 34.

As is known in the art, a radar signal generated from the aircraft will be reflected by an object. The reflected signal is received by equipment on the aircraft. In prior art systems, this reflected signal is translated by equipment located on board the aircraft into information that is used to know the meterological conditions.

The present system includes means on the landing/taxiing area for identifying certain areas of that landing/taxiing area to the aircraft. The best mode of the system includes means 40 located at endpoints of the landing/taxiing area, such as adjacent to each corner 26–32, that are coated with radar signal absorbing material. These corner identifying means can include pads or simply be areas of paint on the ground. The paint can be the same paint developed for Stealth Technology, for example.

Figure 2:
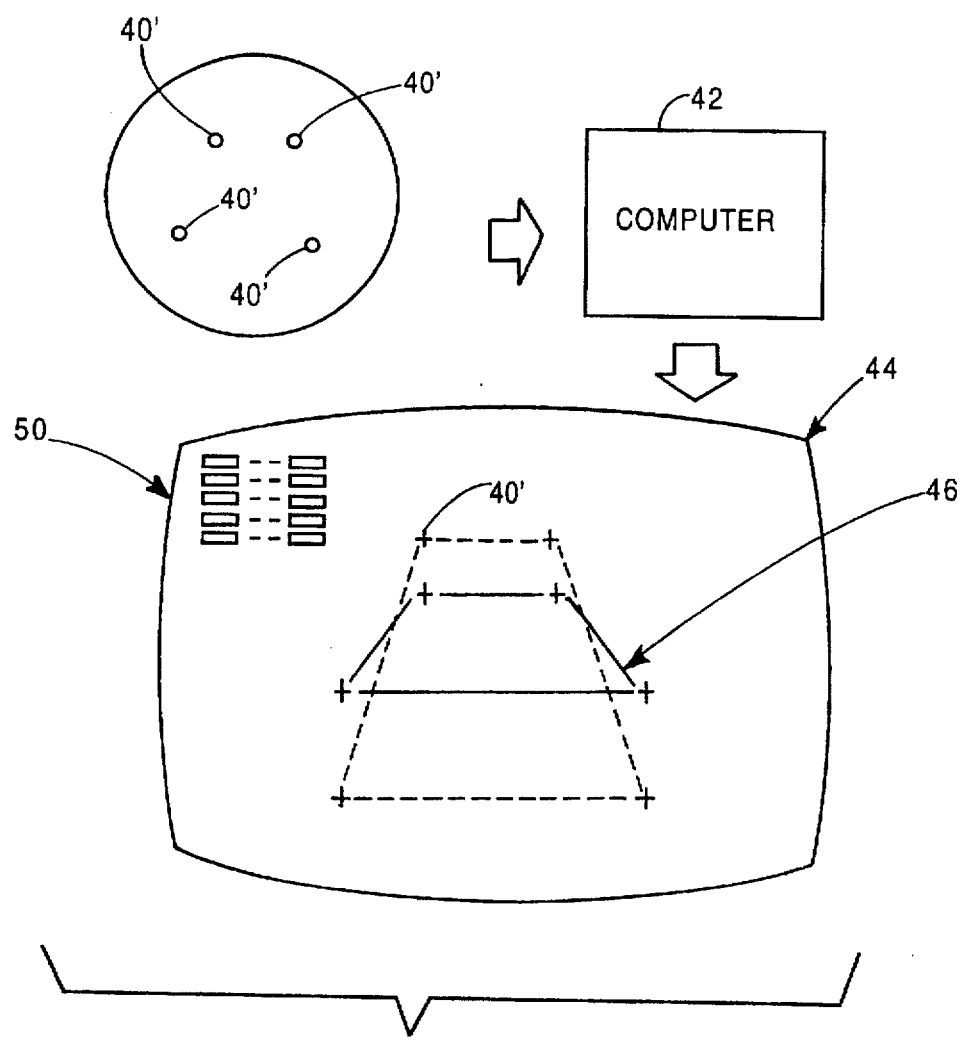
FIG. 2 is a block diagram indicating the display associated with the on-board landing/taxiing guidance system embodying the present invention.

As shown in FIG. 2, the lack of a signal is translated into points 40' in the on-board equipment, which are then transmitted to a computer 42, which controls a display 44. The computer uses computer graphics algorithms to translate points 40' into a landing strip simulation 46. This simulation changes in "real time" as the aircraft approaches the landing/ taxiing area by means of mathematical transformations, such as Euler transformations, Piograms or Quaternions and can be compared with the correct pattern 46a. Other information 50 can also be displayed for the pilot's use. Other mathematical operations can be used, as will occur to those skilled in the art based on the teaching of this disclosure.

Figure 3:
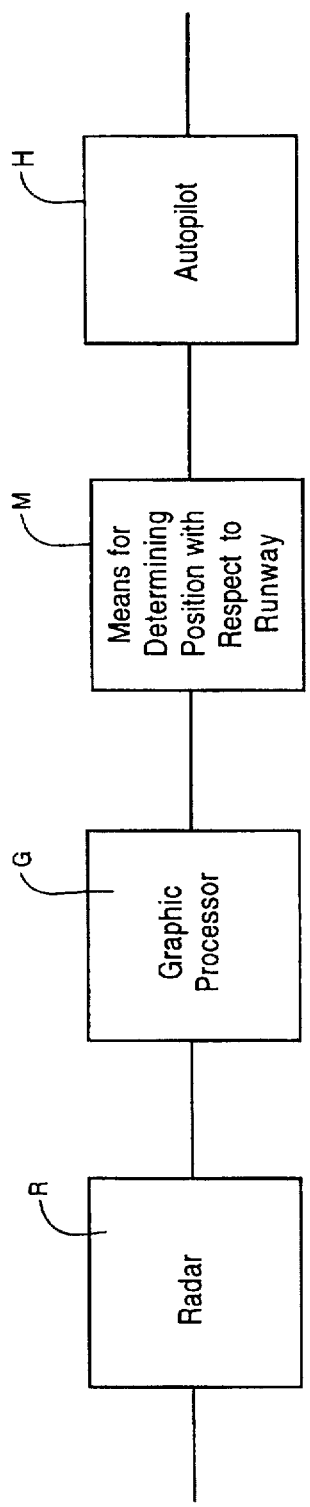
FIG. 3 is a block diagram of an overall on-board landing/ taxiing guidance of the present invention, which includes an autopilot system.

FIG. 3 is a block diagram illustrating a system and shows an on-board radar system R which emits signals and receives return signals. The return signals include areas with no signal corresponding to means 40. The overall signal, containing both return signals and areas of no signal, is fed to a graphic processor G, which includes a microprocessor M or the like that translates this overall signal into a signal which corresponds to the landing/taxiing area. An autopilot A can be connected to the microprocessor to assist in the guidance of the aircraft.

Figure 4:
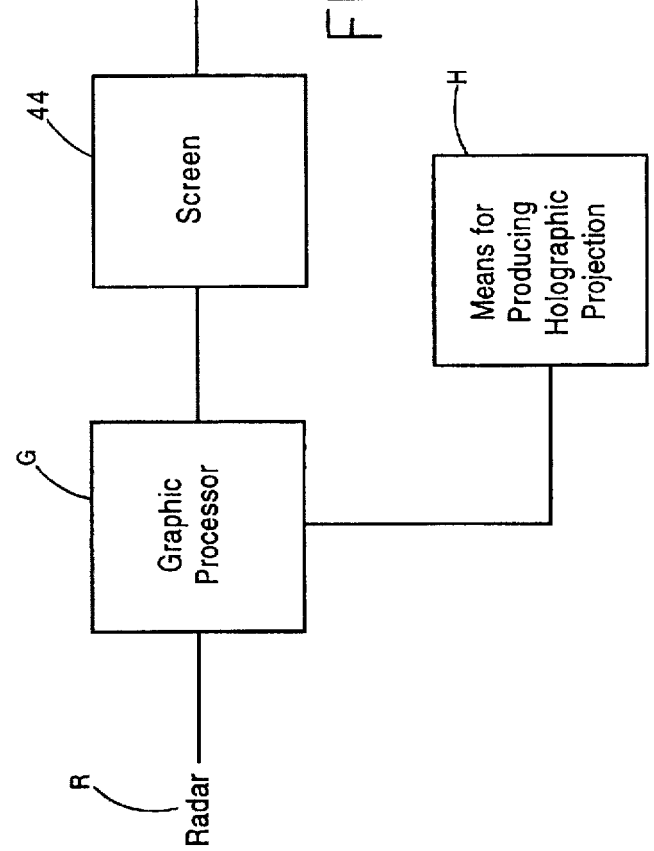
FIG. 4 is a block diagram of an alternative form of the on-board landing/taxiing guidance system in which the perspective display is replaced by a holographic image of the landing/taxiing area.

A further form of the system as shown in FIG. 4 can include a means H for translating the overall signal into a holographic image.

Specific applications of the system are indicated in FIGS. 5–14.

Figure 5:
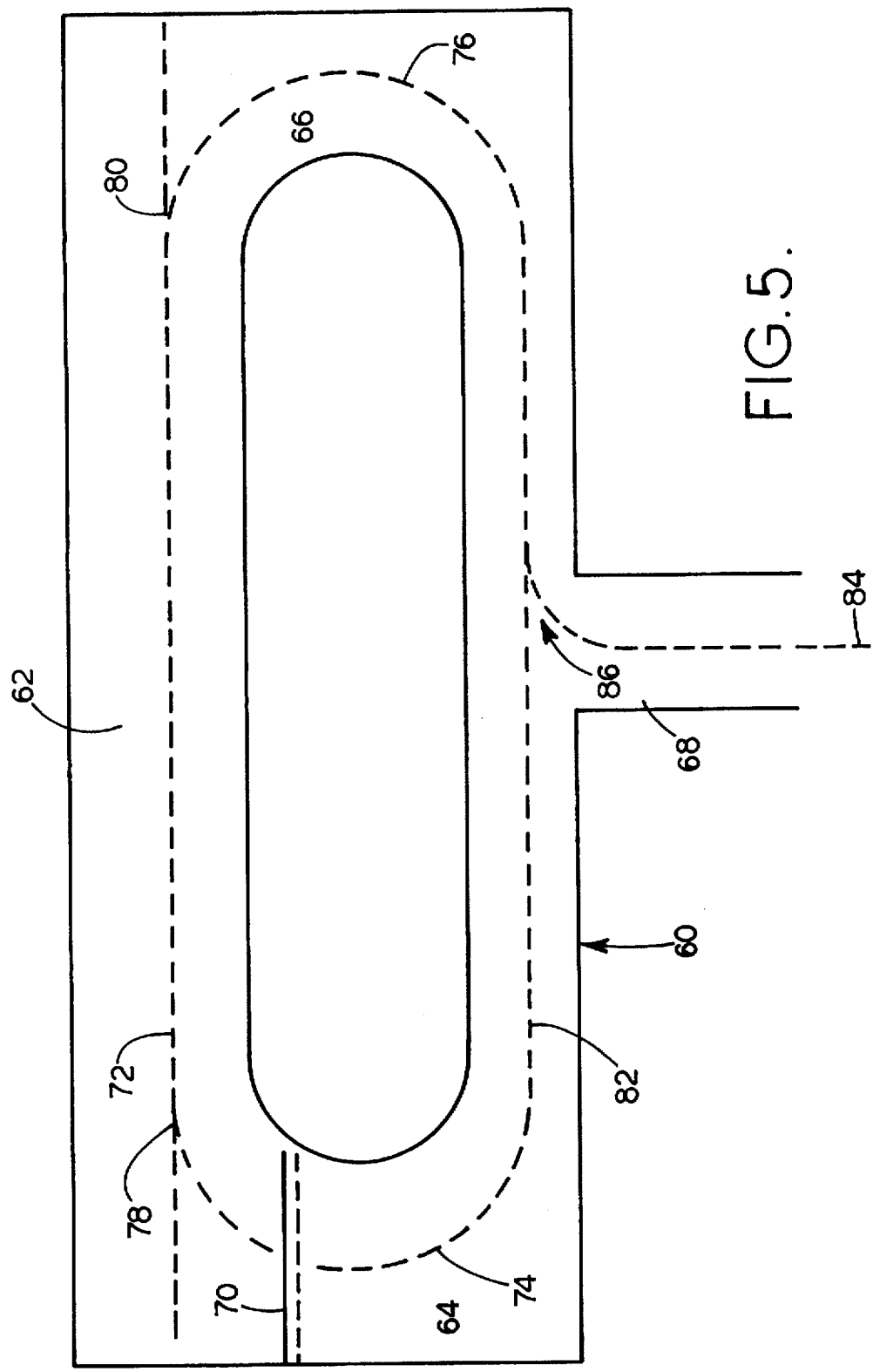
FIG. 5 is schematic of a landing/taxiing area in which the present system can be used.

As shown in FIG. 5, landing/taxiing area 60 includes a runway 62, waiting areas 64 and 66 and an exitway 68 which leads to parking areas (not shown in FIG. 5). Area 64 includes a hold short line 70 which an aircraft is not allowed to cross when it is waiting for permission to take off. Area 60 includes a signal line 72 on the runway, and signal lines 74 and 76 in areas 64 and 66 respectively which intersect line 62 at intersections 78 and 80 respectively. A taxi way signal line 82 extends from lines 74 and 76 and intersects a parking signal line 84 at intersection 86. The signal lines in system 60 are all painted with non-radar reflecting paint and the aircraft follow the lines as will be understood by one skilled in the art from the teaching of the instant disclosure. It is noted that the material used to paint the signal lines can be selected to respond to certain frequencies of radar signals, and not to others whereby area 60 could be modified for secrecy purposes. This will permit the area 60 to be used by certain aircraft, but will remain "invisible" for others. In this way, area 60 could be located in an enemy territory but can remain operative without calling attention to itself by beacon or guide lights commonly used with landing fields. The paint can also be changed to alter frequency response as necessary for security purposes. Still further, the receiver in the aircraft could be adjusted so ice or other such covering on the surface of the landing/taxiing areas would be noted in the aircraft due to the fact that returned signals will appear in the radar screen where "no signal at all" is expected, "the stronger the returned signal, the thicker the ice." Furthermore, the whole area 60 could be painted with different paints or other coverings having different frequency responses in different places each one attenuating the signals in a different way giving the screen a whole pattern of the different parts of the area 60. This will alert the pilot that there is some material on the area into which he is guiding his aircraft. As will be understood, the pilot could follow the signal lines in area 60 even under zero visibility conditions using autopilot so landings and taxiing operations could take place under zero visibility and/or zero ceiling conditions. Of course, the pilot could follow the signal lines visually as well as electronically if suitable and possible.

A parking area 88 is indicated in FIG. 7 as being connected to a runway 62 by exitway 68. A plurality of parking positions, such as parking position 90 are shown, with parking position 90 being used to illustrate the concept embodied in the present invention. Two intersections, 92 and 94 are illustrated in FIGS. 6A and 6B, with a main signal line 96 intersecting a left turn branch 98 or right turn branch 98a at intersection 92 in FIG. 6A, and a right turn branch 100 at intersection 94 in FIG. 6B. As indicated in FIG. 7, in order to go to position 90 from the runway, the aircraft will make a right turn R(1), followed by a left turn $L_1(0)$ and another left turn $L_2(0)$. This procedure can be represented as R,L,L. Information can be imputted according to the instructions of ground control in the on-board computer by simply putting the parking spot number, then the computer turns it to its binary form, with 0=left and 1=right, as 1,0,0. Thus, any parking area can be accessed through the on-board computer by converting the parking position number into its binary value and then translating this binary number into instructions for the autopilot that every time it finds a bifurcation it will decide sequentially simply by right or left according to 0,1 so the pilot needs only input certain data to identify the airport, the runway and the selected parking area. The computer will calculate the data required for the autopilot to perform the aircraft operations at each intersection to reach the chosen parking area.

Figure 9:
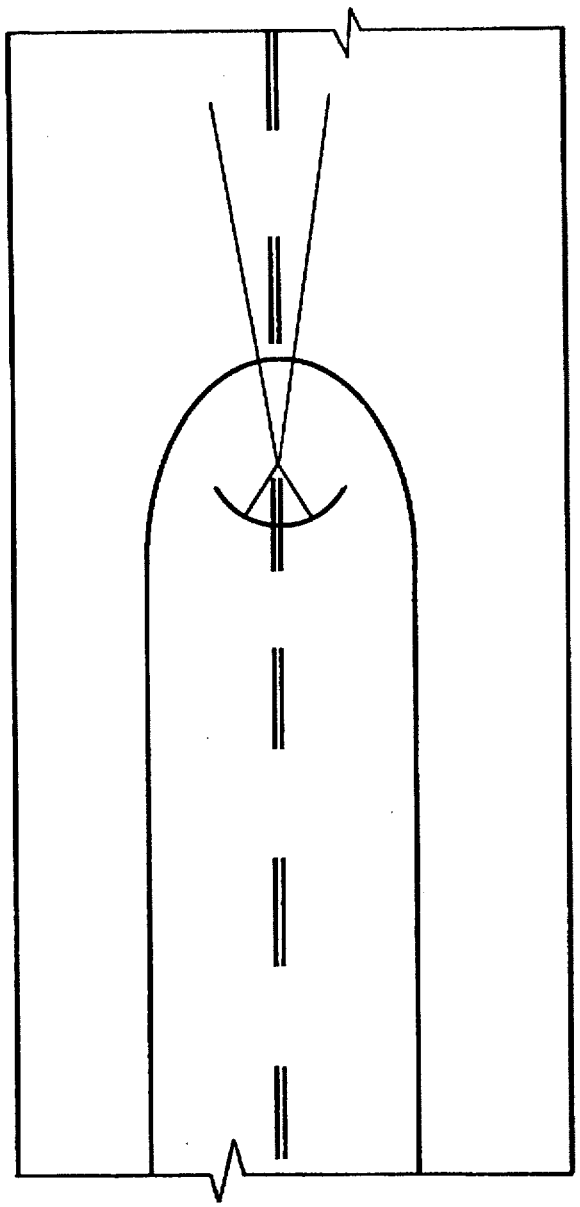
FIG. 9 is a top plan view of the FIG. 8 representation.
Figure 10:
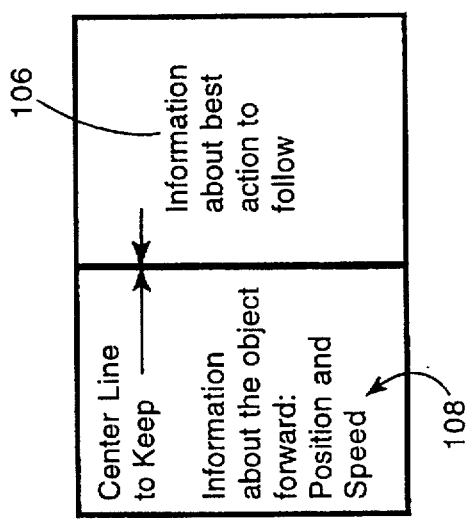
FIG. 10 illustrates a view screen located inside an aircraft to display information of the position of the plane relative to the guide path.
Figure 11:
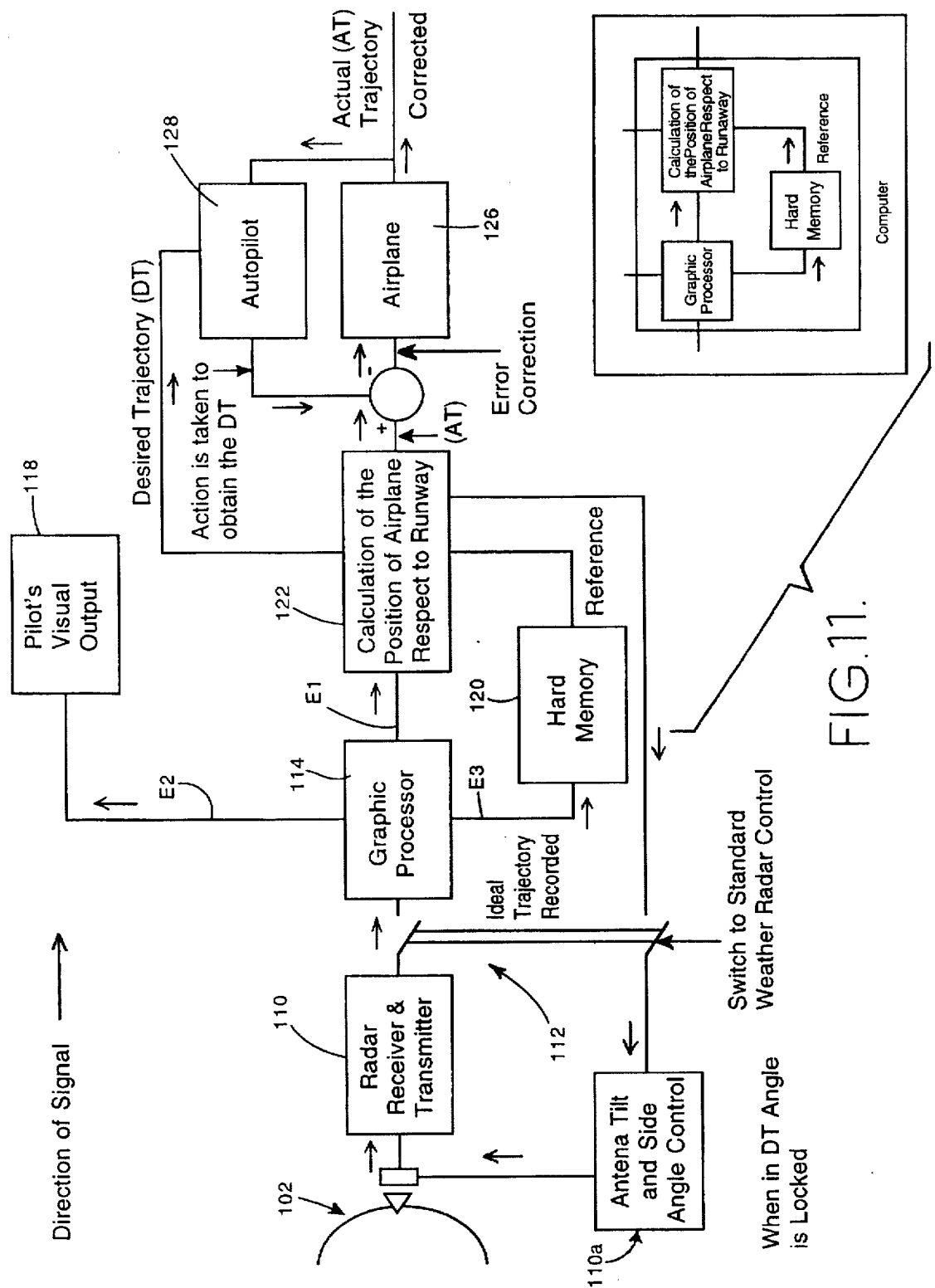
FIG. 11 is a block diagram of the system of the present invention as it is applied to landing an aircraft on automatic pilot.
Figure 12:
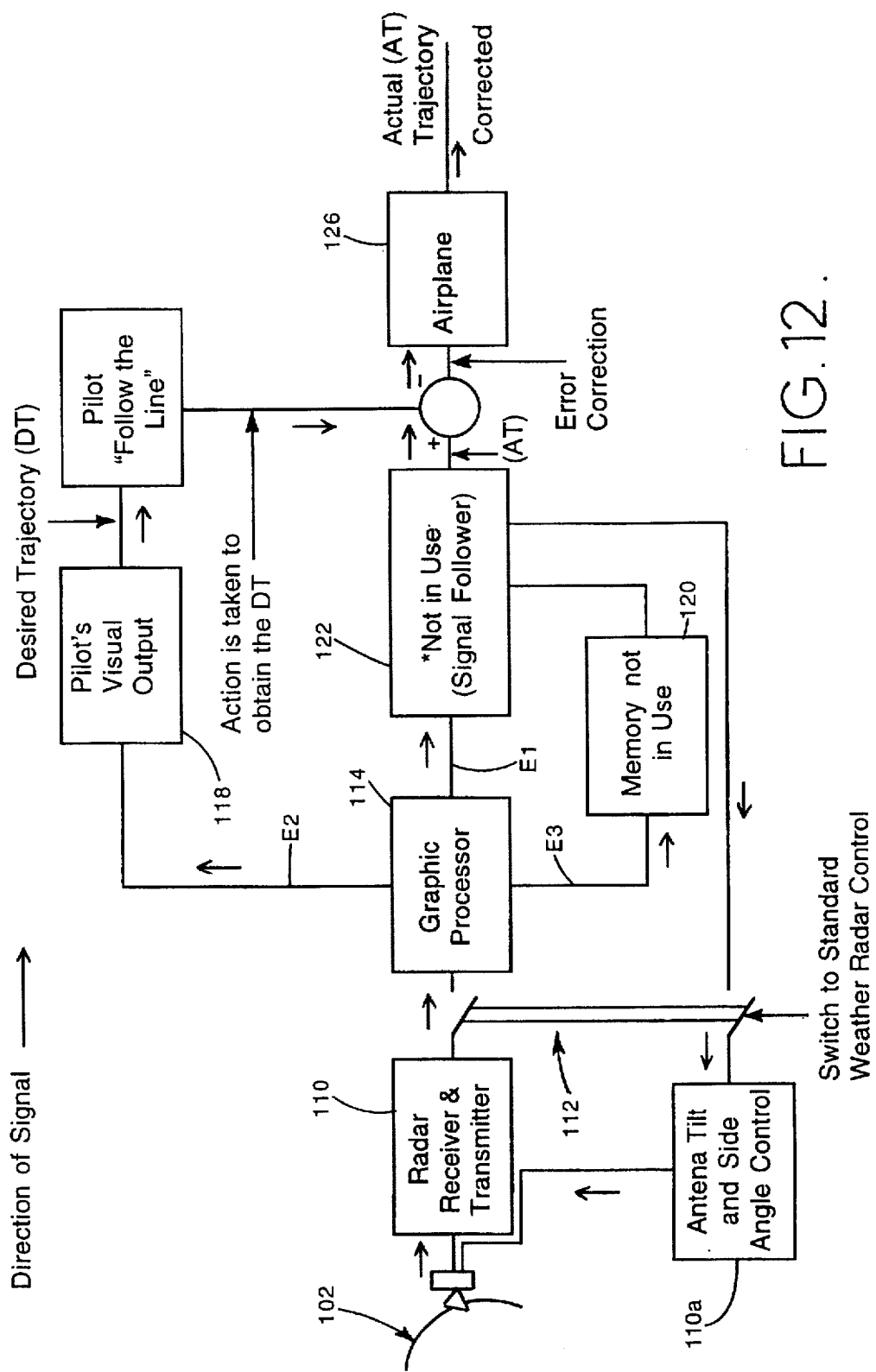
FIG. 12 is a block diagram of the system of the present invention as it is applied to taxiing by a pilot.

The operation of the on-board systems is indicated in FIGS. 8 and 9, with a radar antenna 102 being mounted on the aircraft and movable between a first position directed downwardly toward the ground to "see" non-reflected signals from the pavement and a second position (shown in dotted lines) "looking" forward of the aircraft. In the first position, the program will be simply to follow the line; whereas, in the second position, the program will be to set the speed and position of the aircraft to stop the craft or set a new speed according to conditions that will be encountered. The antenna can be moved between the two positions and the information time multiplexed. The radar can also be set in flight and only for approach purposes to move in a horizontal plane between a third position and a fourth position as necessary. As shown in FIG. 10, the information can be displayed inside the craft to show a pilot the position of the craft relative to the signal line. The computer can also be programmed to display suggested actions 106 on one side of the screen and other information 108 on another side of the screen to assist the pilot, FIGS. 11 and 12 indicate how the system can perform various tasks for the pilot. There are four combinations of tasks possible according to the definitions of taxiing and landing used herein. The four combinations are: landing by automatic pilot; landing by pilot; taxiing by automatic pilot; and taxiing by the pilot. FIGS. 11 and 12 represent two of the four combinations, with those skilled in the art being able to understand the other actions based on the teaching associated with these two figures.

With regard to FIG. 11, the radar antenna 102 receives a signal from the ground, with the antenna facing forward. This signal is relayed to the receiver and transmitter 110. A switch 112 permits the signal to be redirected to a weather control if desired. The switch 112 is shown in the open condition in FIG. 11, but will be closed in actual use. The signal information is then sent to a graphic processor 114 which converts the lack of a signal from the radar receiver into understandable information that can be displayed to a pilot. The information from the graphic processor is divided into a first signal E1 that goes to a calculation process that is used to calculate the position of the plane with respect to the runway, or a signal E2 that is sent to a pilots' visual output 118 where a drawing of the runway itself is displayed. This display can be a computer monitor, a HUD, a holographic projection, a virtual reality visor, or the like. The pilot is "watching" the runway even though he may not be able to actually see the runway through the window of the craft. A signal E3 from the graphic processor is sent to hard memory 120. Such as a hard disk or a floppy disk, or the like, where the information is recorded. The signal E3 is used to "imprint" a procedure into the system. That is, the pilot may execute a landing and a taxiing process manually, but keep the system on so it can "memorize" the procedure. This will permit a pilot to execute a desired maneuver and have the system remember that maneuver so the system can guide subsequent maneuvers on autopilot or can display the desired maneuver for a pilot who wishes to match a current maneuver against a previous maneuver.

Calculation in block 122 is done by combining the information coming from the graphics processor as signal E1 and the reference from signal E3 and comparing the actual drawing in signal E1 with the ideal maneuver in signal E3. If the craft is not on the ideal maneuver path more than a preset amount, as by altitude, glide slope angle or distance, the system can actuate the antenna tilt and side angle control 110a to look for the runway if necessary or to obtain a better view of the runway, this angle control signal passes the weather control switch 112, which is normally closed, and inputs the reference calculated position of the airplane to the anteanna tilt and side angle control 110a. The signal of the actual trajectory goes to a block 126 which is actually flying the trajectory and the desired trajectory that is calculated to track the ideal trajectory is transferred to autopilot 128. The autopilot compares the signals and performs the actions that the airplane requires to track the desired trajectory until the desired trajectory or the ideal trajectory and the actual trajectory become the same one and the desired trajectory corrections are zero and the actual trajectory follows the ideal trajectory until the craft reaches its desired destination, such as landing. At all times, the computer "knows" the position of the aircraft with respect to the runway and that information is then inputted to the autopilot for comparision purposes in order to held calculate "how far" the acutal trajectory differs from the desired trajectory which is also inputted to the autopilot. In a certain way, this method of control could be considered feedforward instead of feedback. Information from the computer which "knows where the plane is all the time" is input to the tilt and angle control of the radar, like the pilot turns his neck to see the runway when it is not in front of the airplane.

Referring to FIG. 12, taxiing by a pilot using the present system is illustrated. As shown in FIG. 12, radar antenna 102 is in the first position directed downwardly and receives a signal from the ground. This signal is sent to the radar receiver and transmitter 110. Switch 112 is shown open, but will be closed in use. The signal is sent to graphic processor 114 which converts the lack of signals from the radar receiver into information that can be understood by a pilot. After the graphic processor, the signal is divided into the following: signal E1 goes to a signal follower block which performs no task in this case but letting the signal E1 pass from the graphic processor directly to the adding block (which is the circle with + and − signs); signal E2 which is sent to the pilots' visual output 118; and signal E3 is disconnected since memory is generally not required for taxiing or parking, but could be used if desired. The desired ground trajectory is obtained simply by "following the line," which in this case is performed by the pilot and is represented here by a block. The system can actuate the antenna tilt control to look forward if there are obstacles in the pavement and anticipate a control input, the signal also passes the weather control switch 112 which is closed during this operation. The signal of the "line being followed" goes to a block 126 which represents the airplane actually taxiing that line. The pilot looks at the drawing in the pilots' visual output block 118, compares this signal and performs the actions that the airplane requires to track the desired line. When it bifurcates, the pilot decides if the action has to be right or left, when the line finishes, he stops and the plane is parked. The antenna tilts constantly only vertically as explained above, thus, the side angle is not required.

Figure 13:
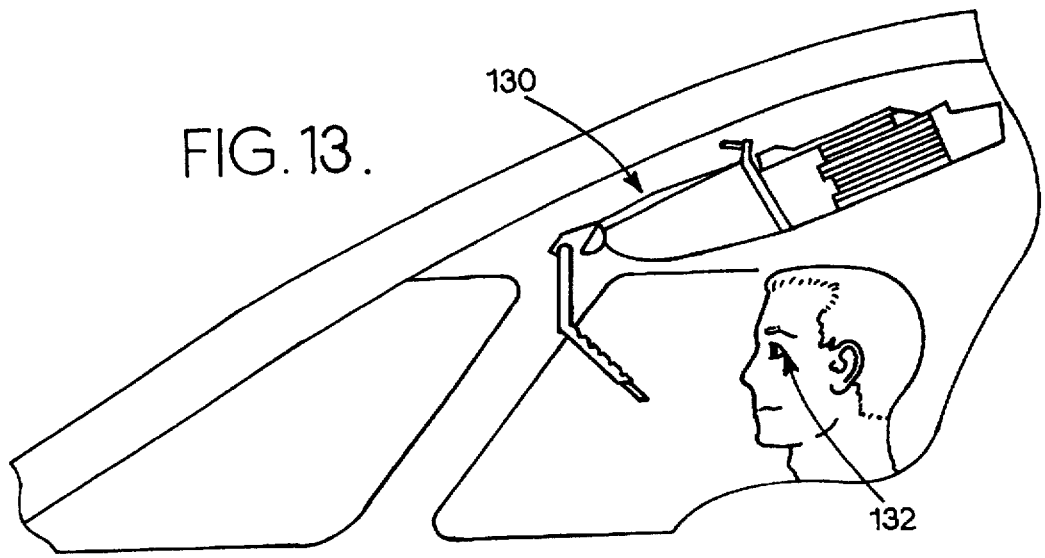
FIG. 13 illustrates the use of the system in conjunction with a collimated HUD installation.
Figure 14:
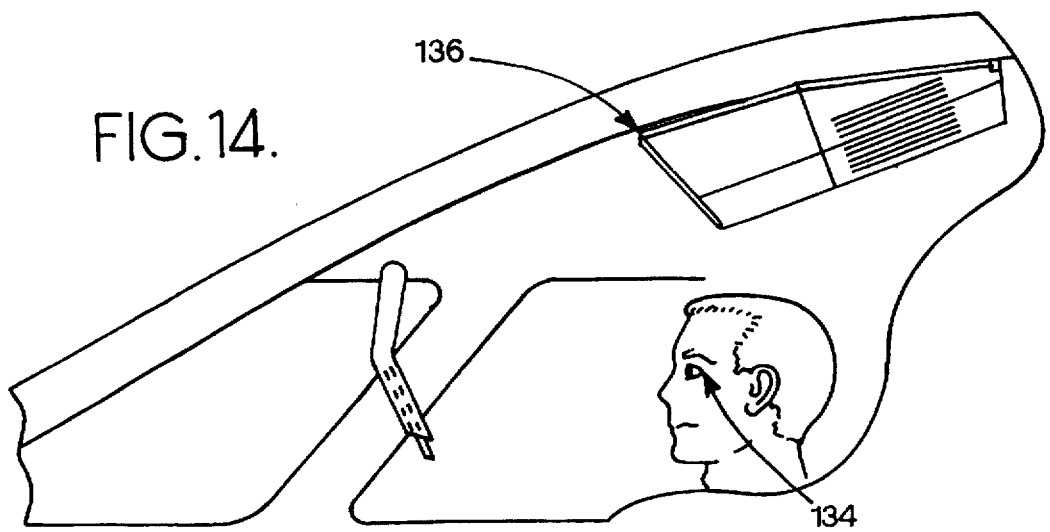
FIG. 14 illustrates the use of the system in conjunction with a pupil-relayed HUD installation.

A collimated heads up display is shown in FIG. 13 with the HUD outline shown at 130 and its related design eye position shown at 132; with a pupil relayed HUD installation being shown in FIG. 14, with design eye position 134 being shown in relation to HUD outline 136.

Figure 15:
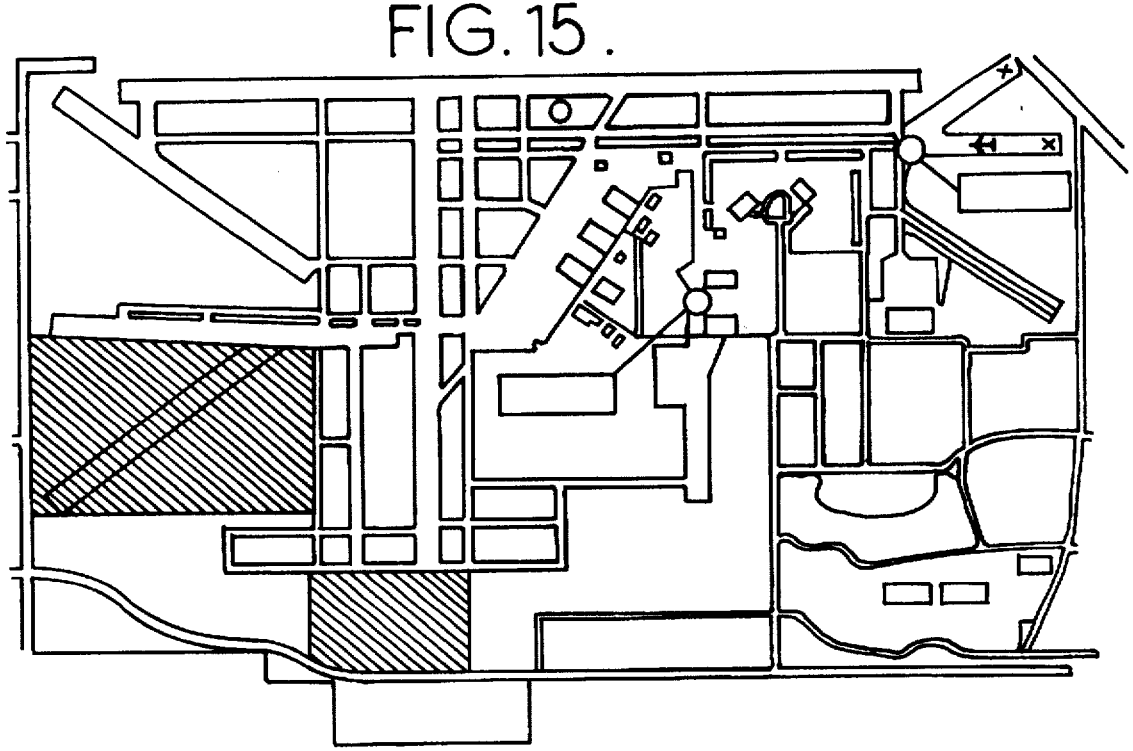
FIG. 15 is an example of an airport with various runways and taxiways.
Figure 16:
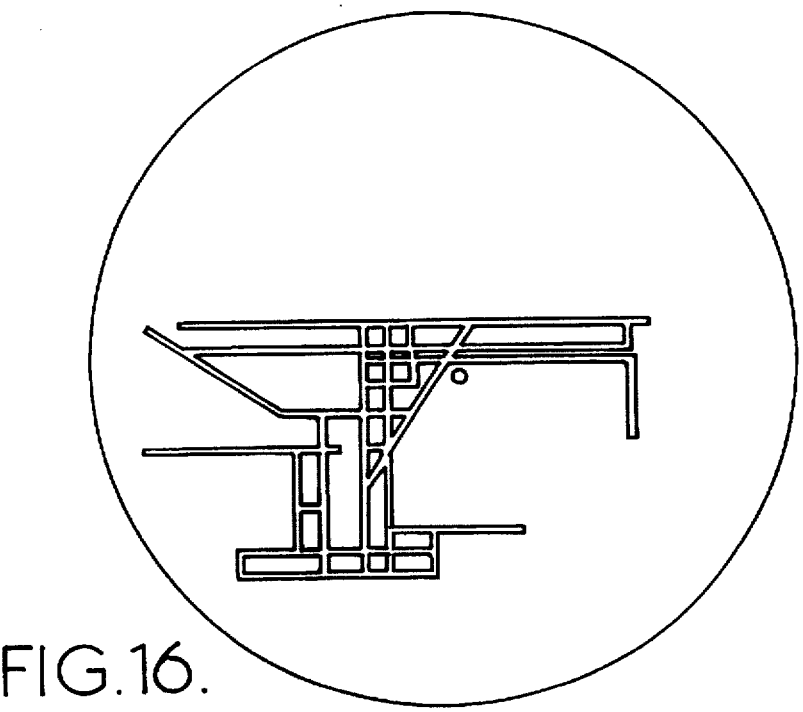
FIG. 16 illustrates how the airport shown in FIG. 15 will appear on a radar system located in the control tower, including antenna and screen (due to the fact that parts of the runway are recognized by radar, a radar antenna can also be located over the roof of the control tower) thus creating a "Detection System for Aircraft on the Ground."

FIG. 15 is an example of a real airport with various runways and taxiways. FIG. 16 shows how this airport will appear on a radar screen located at the control tower. If there are any vehicles on the runways or taxiways, these vehicles will block the radar signal and the airport will show broken lines permitting the "Detection System for Aircraft on the Ground." While the screen is shown circular, it can also be rectangular if desired in order to use a computer monitor.

It is also noted that the system of the present invention can use low power radar which can be used without undue danger to animals and humans in the vicinity of the airport.

It is understood that while certain forms of the present invention have been illustrated and described herein, it is not to be limited to the specific forms or arrangements of parts described and shown.

I claim:

1. An aircraft landing/taxiing guidance system comprising:
  A) means on a ground-located landing/taxiing area for identifying certain areas of that landing/taxiing area to an aircraft, said means including means for absorbing radar signals positioned at preselected locations on the landing/taxiing area;
  B) radar signal emitting means on the aircraft for transmitting radar signals toward the landing/taxiing area during a landing/taxiing, transmitted signals incident on said means for absorbing radar signals being absorbed by said means for absorbing radar signals;
  C) signal processing means on the aircraft for receiving radar signals reflected back to the aircraft from the landing/taxiing area and translating the lack of signals associated with the signals which have been absorbed by said means for absorbing radar signals into a perspective depiction of the landing/taxiing area, said signal processing means including means for changing the perspective depiction as the position and orientation of the aircraft changes with respect to the landing/taxiing area; and
  D) display means on the aircraft connected to said signal processing means for displaying the perspective depiction.

2. The aircraft landing/taxiing guidance system defined in claim 1 wherein said signal processing means includes processor means for mathematically translating received signals into positional signals.

3. The aircraft landing/taxiing guidance system defined in claim 2 wherein said preselected locations include endpoints of the landing/taxiing area.

4. The aircraft landing/taxiing guidance system defined in claim 3 said endpoints include corners of said landing/taxiing area.

5. The aircraft landing/taxiing guidance system defined in claim 4 wherein said processor means includes means for applying Euler transforms to the signals.

6. The aircraft landing/taxiing guidance system defined in claim 5 wherein said radar signal absorbing means includes radar absorbing paint.

7. The aircraft landing/taxiing guidance system defined in claim 6 wherein said preselected locations include parking areas.

8. The aircraft landing/taxiing guidance system defined in claim 1 further including an autopilot system in the aircraft which is connected to said signal processing means.

9. The aircraft landing/taxiing guidance system defined in claim 8 further including a heads up display connected to said signal processing means.

10. The aircraft landing/taxiing guidance system defined in claim 1 wherein said means on a ground-located landing/taxiing area includes different paints each having a frequency of reflection unique to itself.

11. The aircraft landing/taxiing guidance system defined in claim 10 wherein one paint of said paints is applied to a centerline of the landing/taxiing area.

12. The aircraft landing/taxiing guidance system defined in claim 1 further including radar in a control tower.

13. The aircraft landing/taxiing guidance system defined in claim 4 wherein said signal processor means includes means for applying computer graphics algorithms to the signals.

14. The aircraft landing/taxiing guidance system defined in claim 4 wherein said signal processor means includes means for applying Quaternions to the signals.

15. The aircraft landing/taxiing guidance system defined in claim 4 wherein said signal processor means includes means for applying Piograms to the signals.

16. The aircraft landing/taxiing guidance system defined in claim 6 wherein preselected locations include take off areas.

17. The aircraft landing/taxiing guidance system defined in claim 10 wherein different paints are applied to different areas of the landing/taxiing area until said landing/taxiing area is completely covered.

18. The aircraft landing/taxiing guidance system defined in claim 12 further including means for transmitting information from the control tower to airplanes on the ground.

19. An aircraft landing/taxiing guidance system comprising:

A) means on a ground-located landing/taxiing area for identifying certain areas of that landing/taxiing area to an aircraft, said means including radar signal absorbing means for absorbing radar signals positioned at preselected locations on the landing/taxiing area with radar signal absorbing means at one location being different from radar signal absorbing means at another location for distinguishing one location from another;

B) radar signal emitting means on the aircraft for transmitting radar signals toward the landing/taxiing area during a landing/taxiing, transmitted signals incident on said means for absorbing radar signals being absorbed by said means for absorbing radar signals;

C) signal processing means on the aircraft for receiving radar signals reflected back to the aircraft from the landing/taxiing area and translating the lack of signals associated with the signals which have been absorbed by said means for absorbing radar signals into a perspective depiction of the landing/taxiing area, said signal processing means including means for changing the perspective depiction as the position and orientation of the aircraft changes with respect to the landing/taxiing area; and D) display means on the aircraft connected to said signal processing means for displaying the perspective depiction.

* * * * *